UNITED STATES PATENT OFFICE.

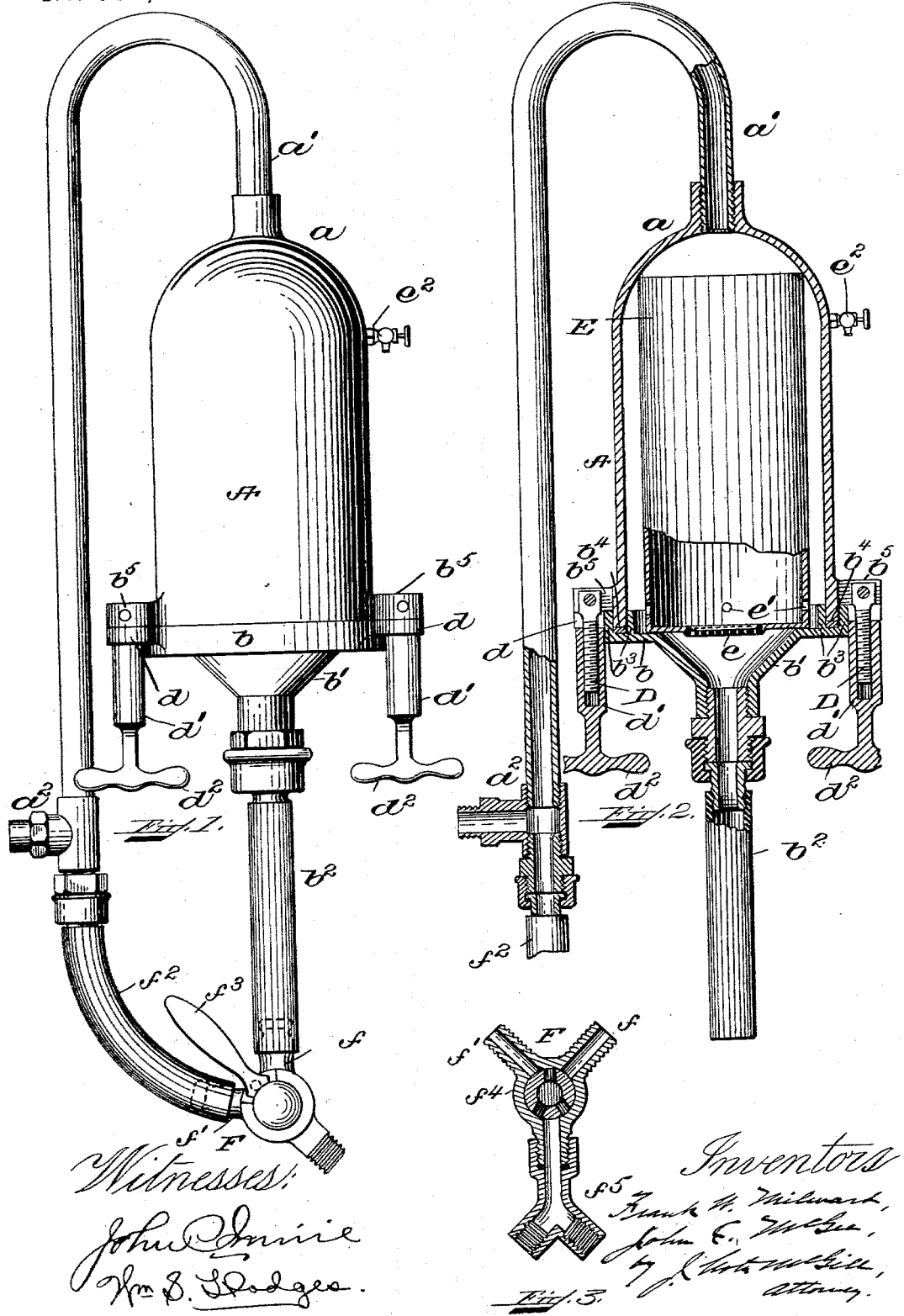

FRANK W. MILWARD AND JOHN C. McGEE, OF BOSTON, MASSACHUSETTS.

PIPE-CLEANER.

SPECIFICATION forming part of Letters Patent No. 589,740, dated September 7, 1897.

Application filed November 16, 1896. Serial No. 612,356. (No model.)

*To all whom it may concern:*

Be it known that we, FRANK W. MILWARD and JOHN C. McGEE, of Boston, in the county of Suffolk and State of Massachusetts, have invented certain new and useful Improvements in Pipe-Cleaners; and we do hereby declare the following to be a full, clear, and exact description of the invention, such as will enable others skilled in the art to which it appertains to make and use the same.

This invention contemplates certain new and useful improvements in beer-pipe cleaners. Heretofore various devices of this kind have been employed for removing from beer-pipes the fungus growth caused by the fermented yeast in the beer, the presence of which affects the taste of the latter, injures the quality thereof, and sometimes affects the consumer. The principal medium employed for cleansing these pipes consists of soda or some alkaline substance through which the water is passed, so as to be charged therewith before entering the pipes. We have found in actual practice that the receptacles for this solvent compound are apt to become clogged by corrosion, the latter in some instances also extending to the pipes.

The object of our invention is to provide a cleaner of this character having a receptacle for the solvent which can be easily removed for the purpose of cleansing.

The invention will be hereinafter fully set forth, and particularly pointed out in the claims.

In the accompanying drawings, Figure 1 is a view in side elevation. Fig. 2 is a vertical longitudinal sectional view with parts of the inlet-tube broken away and shown in section. Fig. 3 is a detail view in section.

Referring to the drawings, A designates a cylindrical chamber open at its lower end and having its upper end $a$ of dome shape. Into this end opens one end of a water-pipe $a'$, to which at $a^2$ a hose or pipe leading from the water-main or street-supply may be connected. The bottom $b$ of this chamber is removably connected thereto and formed with a central funnel-like portion $b'$, to which a hose or pipe $b^2$ is connected. The bottom $b$ is formed with upper circumferential flanges $b^3$, forming a groove, wherein fits the lower end of the chamber, a gasket $b^4$ making a water-tight joint. To ears $b^5$, projecting laterally from chamber A, are pivotally connected depending screw-rods D, which latter extend through slotted ears $d$ of bottom $b$. Internally-threaded sleeves $d'$, having handle ends $d^2$, inclose these threaded rods and upon being screwed upwardly on the latter tight against the ears $d$ serve to bind the chamber and its bottom together.

E is a removable receptacle located within chamber A and resting on the bottom $b$. This receptacle is open at its upper end and at the center of its bottom is provided with a strainer $e$, and above the latter in the cylindrical wall of the receptacle are drain-holes $e'$. By disconnecting the bottom $b$ from the chamber A the receptacle E, in which the soda or other alkaline substance is placed, may be readily removed for the purpose of cleansing. In the top of chamber A is a suitable vent-valve $e^2$.

F is a two-way cock, one branch $f$ of which is connected to the lower end of pipe $b^2$, while to the branch $f'$ is connected one end of a pipe or hose $f^2$, the other end of which is attached to the lower end of water-supply pipe $a'$. A handle $f^3$ controls the position of this cock. When in the position shown in Fig. 1, the cock is closed to both pipes $b^2$ and $f^2$, but by being moved to the left or right either the pipe $f^2$ or $b^2$ will be free to discharge. To the casing $f^4$ of this cock is connected a Y $f^5$, to which two pipes (not shown) leading to the beer-pipes may be attached, or to a single extension but one such pipe may be united.

In practice a suitable quantity of the solvent is placed in the receptacle E and the cock F is turned so that the outlet from pipe $b^2$ is opened, thus closing pipe $f^2$. The water passing into pipe $a'$ enters the receptacle and from the latter flows through pipe $b^2$ onto the beer-pipes. After this has continued a few minutes, sufficient to allow of the removal of the deleterious substances within the beer-pipes, the handle of the cock is moved to the left, cutting off the outflow from pipe $b^2$ and opening up communication with pipe $f^2$, thus allowing pure water to pass to the beer-pipes for the purpose of removing all trace of the solvent, &c., therefrom. After the device has been used for some time the receptacle is removed therefrom and thoroughly cleansed. In this way we avoid corrosion therein, thus insuring the purity of the solvent used in cleaning the pipes.

The advantages of our invention are apparent to those skilled in the art to which it appertains, and it will be specially observed that a cleaner constructed as herein described is extremely simple and inexpensive, not liable to readily get out of order, and that the same is capable of being thoroughly cleansed and maintained in a pure state.

We claim as our invention—

1. A cleaner of the character herein described, comprising a water-chamber having an upper supply-opening and open at its lower end, a removable bottom for said chamber having a water-outlet and a flat horizontal portion, means for detachably holding said flat horizontal portion of said bottom against the lower end of said chamber, and the receptacle open at its ends and resting upon said flat horizontal portion of said bottom adjoining said water-outlet, substantially as set forth.

2. A cleaner of the character herein described, comprising a water-chamber having an upper supply-opening, a water-pipe communicating with said supply-opening, a removable bottom provided with a funnel-like extension, means for detachably holding said bottom to said chamber, an outlet pipe or hose connected to said funnel-like extension, and a two-way cock having its casing provided with two branches, one of which is connected to a branch of said water-pipe and the other to said outlet pipe or hose, substantially as and for the purpose set forth.

In testimony whereof we have signed this specification in the presence of two subscribing witnesses.

FRANK W. MILWARD.
JOHN C. McGEE.

Witnesses:
CHAS. C. NICHOLS,
CONRAD J. RUETER.